United States Patent
Buono et al.

(10) Patent No.: US 9,156,562 B2
(45) Date of Patent: Oct. 13, 2015

(54) PROPULSION AND MOTION-TRANSMISSION ASSEMBLY, IN PARTICULAR FOR A ROTARY-WING AIRCRAFT

(75) Inventors: Fabrizio Buono, Carmagnola (IT); Stefano Cini, Santena (IT)

(73) Assignee: Tecnocad Progetti S.P.A., Turin (IT)

( * ) Notice: Subject to any disclaimer, the term of this patent is extended or adjusted under 35 U.S.C. 154(b) by 331 days.

(21) Appl. No.: 13/817,424

(22) PCT Filed: Jul. 19, 2011

(86) PCT No.: PCT/IB2011/053208
§ 371 (c)(1),
(2), (4) Date: Apr. 3, 2013

(87) PCT Pub. No.: WO2012/023066
PCT Pub. Date: Feb. 23, 2012

(65) Prior Publication Data
US 2013/0231208 A1   Sep. 5, 2013

(30) Foreign Application Priority Data
Aug. 16, 2010   (IT) .............................. TO2010A0702

(51) Int. Cl.
  *B64D 35/08*  (2006.01)
  *B64C 27/10*  (2006.01)
  *B64C 27/12*  (2006.01)
  *B64D 27/24*  (2006.01)

(52) U.S. Cl.
  CPC ................ *B64D 35/08* (2013.01); *B64C 27/10* (2013.01); *B64C 27/12* (2013.01); *B64D 27/24* (2013.01); *Y02T 50/44* (2013.01); *Y02T 50/62* (2013.01)

(58) Field of Classification Search
  CPC ........ Y02T 50/44; Y02T 50/62; B64D 35/08; B64D 27/24; B64C 27/10; B64C 27/12; B64C 27/16
  See application file for complete search history.

(56) References Cited

U.S. PATENT DOCUMENTS

| 2,380,889 | A | * | 7/1945 | Waseige .......................... 416/125 |
| 4,531,692 | A | * | 7/1985 | Mateus ........................ 244/17.19 |
| 4,709,882 | A |   | 12/1987 | Galbraith |
| 5,135,442 | A | * | 8/1992 | Bossler, Jr. ........................ 475/1 |
| 5,802,918 | A | * | 9/1998 | Chen et al. ........................ 74/416 |
| 6,293,492 | B1 | * | 9/2001 | Yanagisawa ................. 244/17.25 |
| 2011/0024554 | A1 | * | 2/2011 | Monleau et al. ............ 244/17.23 |

FOREIGN PATENT DOCUMENTS

DE   202006005862 U1   6/2006
WO   2004094868 A1   11/2004

OTHER PUBLICATIONS

International Search Report and Written Opinion dated Nov. 24, 2011 for International Application No. PCT/IB2011/053208, 10 pages.

* cited by examiner

*Primary Examiner* — Justin Holmes
(74) *Attorney, Agent, or Firm* — Patterson & Sheridan, LLP

(57) ABSTRACT

A propulsion and motion-transmission assembly (1), in particular for a rotary-wing aircraft, the assembly (1) comprising: a first motor-reducer assembly (2); and a second motor-reducer assembly (4), wherein the first and second motor-reducer assemblies (2, 4) are arranged for driving in rotation at least one rotor of a rotary-wing aircraft; and wherein each of said first and second motor-reducer assemblies (2, 4) comprises:—a mechanical differential (6, 24) including a first input shaft (8; 26), a second input shaft (10; 28) and an output shaft (12, 30); and—a first electric motor (14; 32) and a second electric motor (16; 34) connected, respectively, to said first and second input shafts (8, 10; 26, 28), the output shaft of each motor-reducer assembly being arranged for connection in rotation to a rotor of a rotary-wing aircraft.

9 Claims, 3 Drawing Sheets

PROPULSION AND MOTION-TRANSMISSION ASSEMBLY, IN PARTICULAR FOR A ROTARY-WING AIRCRAFT

FIELD OF THE INVENTION

The present invention relates to propulsion and motion-transmission systems, in particular for rotary-wing aircraft and for the transmission of motion to one or more rotors installed thereon.

Description of the Known Art and General Technical Problem

Rotary-wing aircrafts find use in various civilian and military applications on account of their great versatility and their capacity of performing manoeuvres otherwise impossible with fixed-wing aircraft.

In the technical field of rotary-wing flight, the most common choice for propulsion and motion-transmission assemblies is to adopt a fluid machine, for example a reciprocating internal-combustion engine or a gas turbine, coupled to a mechanical transmission connected to a rotor.

However, especially in aircraft where propulsion is entrusted to a single gas turbine, in the case where the latter ceases to function on account of a failure, the consequent rapid descent of the aircraft to the ground can be governed only thanks to autorotation of the rotor.

To guarantee the safety for the occupants of the aircraft even in the event of a failure, propulsion assemblies generally comprise two or more motor units connected to the rotor, the power of which is oversized with respect to the requirements of normal flight in such a way that, in the event of a failure of one of them, the motor unit that is still functioning is able to maintain the aircraft in flight, making up for the failure in delivering power of the failed motor unit.

It is, however, not always possible to have available a redundant propulsion assembly, since on many aircraft for reasons linked to the reduction of the weight and to the size it is generally impossible to install more than one motor unit. In this case, in the event of a failure the only possibility of controlling the aircraft depends, as has been said, upon autorotation of the rotor. For this reason, in fact, flying over population centres with single-turbine helicopters is forbidden by specific rules.

In the case, moreover, where the rotary-wing aircraft is not a helicopter of a traditional type but a vehicle equipped with wheels for advancing on the ground and to which a flight module has been applied (vehicles of this type are known, for example, from documents GB-A-908691 and GB-A-938686), it is evident that, in addition to the requirements of redundancy typical of any aeronautics application, the need to contain the weights and to provide a system that is as compact as possible and can be easily installed assumes still greater importance.

It should moreover not be forgotten that the choice that is today common to almost all rotary-wing aircraft is to adopt gas turbines as motor units, which leads to a well known series of problems in their regulation. In general, on account of the difficulty of regulation of gas turbines, the variation of the lift of the blades of the rotor is generally obtained by varying the collective pitch rather than by varying the r.p.m. of the turbine (or turbines), which substantially works (work) at a fixed r.p.m.

This poses a constraint on the maximum speed of translation of the aircraft, since, as is known to the person skilled in the branch, in conditions of transonic flow of the fluid current with respect to the blade there occur dangerous vibrational phenomena (transonic flutter). Since the relative velocity between the fluid current and the blade in any point of the blade itself is equal to the vector sum of the tangential velocity of the blade due to the motion of rotation and of the speed of translation of the aircraft, it is evident that the most critical point is the periphery of the blade, in particular in a position where the two velocities mentioned above have parallel vectors having the same direction.

In fact, whereas the speed of translation is uniform on the entire rotor, the tangential velocity is maximum at the periphery of the blade, this being at a maximum distance from the axis of rotation of the rotor. The limit velocity of translation of the aircraft is that whereby the flow at the periphery of the blade occurs in conditions at the limit of the transonic regime, in particular at Mach 0.9 (approximately).

In addition, a transmission of a mechanical type set between one or more gas turbines and the rotor inevitably leads to the disadvantage of the dynamic coupling with the rotors, which implies that all the harmonic motions of the rotors result in similar oscillations in operation of the transmission and of the gas turbine itself (or gas turbines, if they are more than one), with evident irregularities of operation, which, if not countered, can lead to premature wear of the components.

Object of the Invention

The object of the present invention is to overcome the technical problems described previously. In particular, the object of the invention is to provide a propulsion and motion-transmission assembly for a rotary-wing aircraft that will be able to maintain its own functionality even following upon a failure, with a reduced weight and encumbrance, and that, given the same power installed, will be such as to enable higher speeds of translation as compared to known systems. The object of the present invention is moreover to provide a propulsion and motion-transmission assembly for a rotary-wing aircraft that will enable easy variation of the velocity of rotation of one or more rotors of said aircraft.

SUMMARY OF THE INVENTION

The object of the present invention is achieved by a propulsion and motion-transmission assembly having the features forming the subject of one or more of the ensuing claims, which form an integral part of the technical teaching herein provided in relation to the invention.

BRIEF DESCRIPTION OF THE DRAWINGS

The invention will now be described with reference to the annexed drawings, which are provided purely by way of non-limiting example and in which.

DETAILED DESCRIPTION OF THE INVENTION

Figure 1:
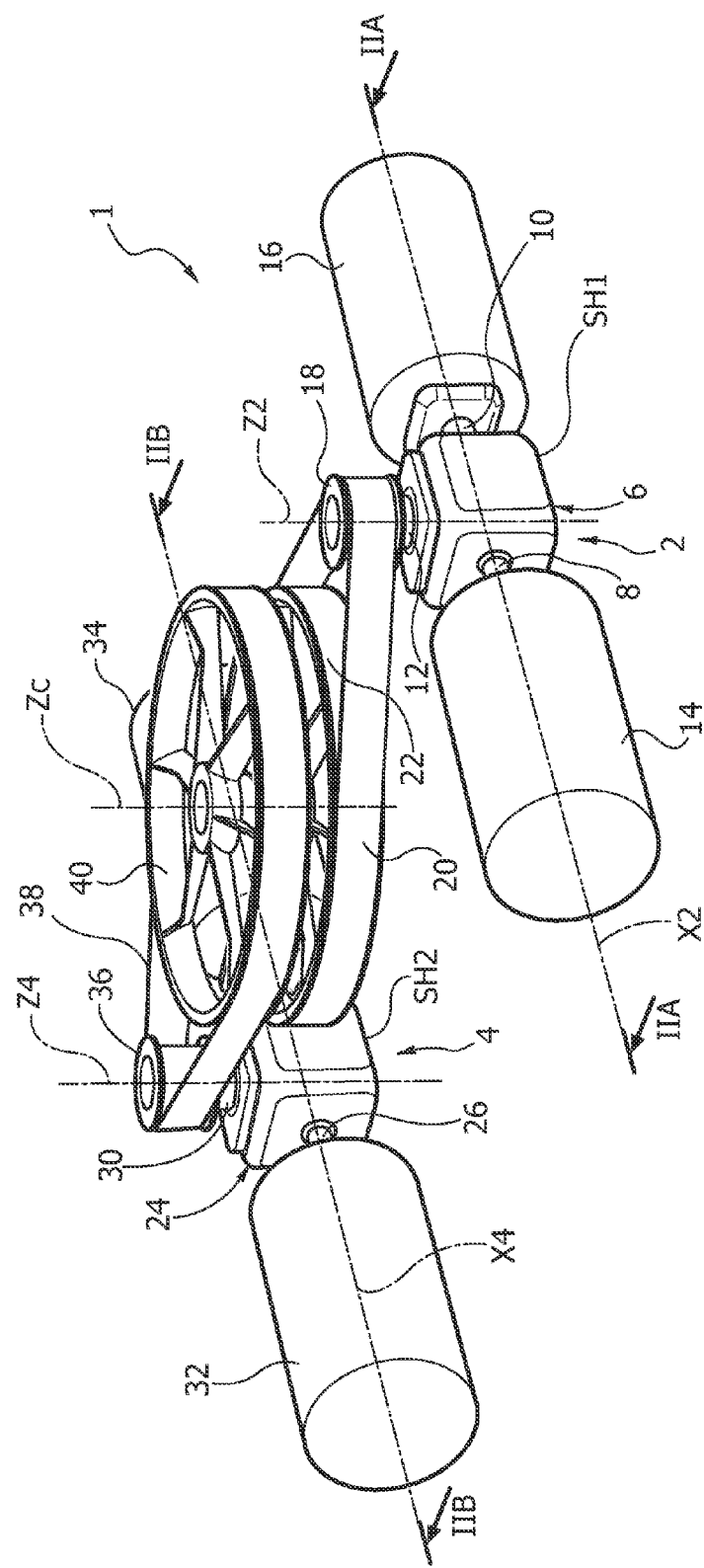
FIG. 1 is a perspective view of a propulsion and motion-transmission assembly according to the present invention.

Designated by 1 in FIG. 1 is a propulsion and motion-transmission assembly according to the invention. The assembly 1 comprises a first motor-reducer assembly 2 and a second motor-reducer assembly 4 that are identical to one another.

The motor-reducer assembly 2 comprises a first mechanical differential 6 preferably of an open type (the so-called "open differential"), comprising a first input shaft 8 and a second input shaft 10 that are coaxial to one another and to a first axis of rotation X2, about which they are able to turn, and an output shaft 12, which can rotate about and has axis coinciding with a second axis of rotation Z2 orthogonal to the axis X2 and orthogonal with respect to the input shafts 8, 10.

Connected to the first and second input shafts 8, 10 are, respectively, a first electric motor 14 and a second electric motor 16, which are identical to and coaxial with one another and to the axis X2.

Figure 2:
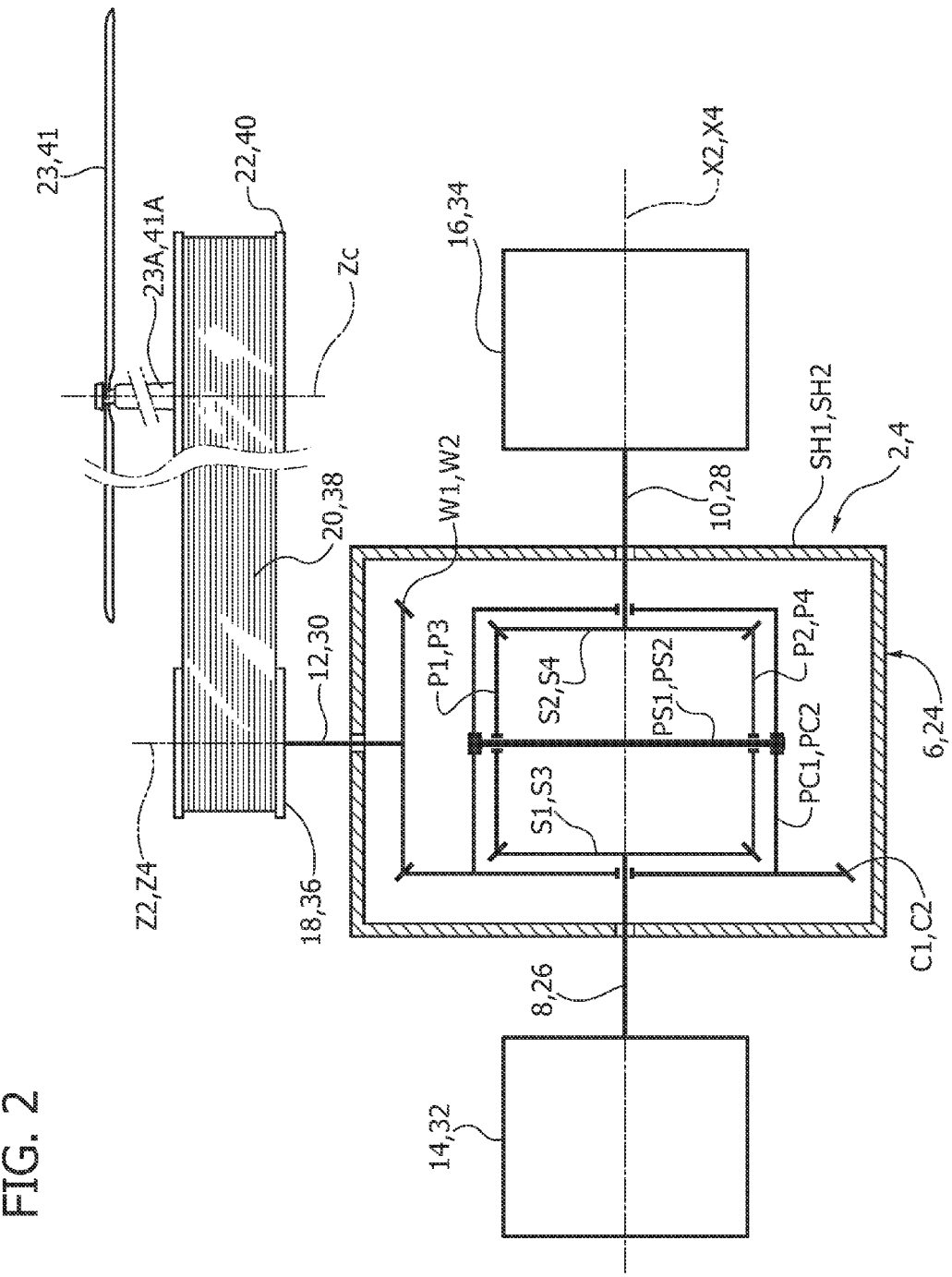
FIG. 2 is a partially sectioned schematic view corresponding, indifferently, to a first functional complex of the assembly of FIG. 1 (trace IIA-IIA) and to a second functional complex of the assembly of FIG. 1 (trace IIB-IIB)

For the ensuing description, reference shall be made to FIG. 2, where the references comprise pairs of numbers separated by a comma. In each pair, the reference number to the left of the comma is associated to the motor-reducer assembly 2, whilst, as will emerge clearly from what follows, the number to the right of the comma is associated to the motor-reducer assembly 4 and the components designated by numbers of the same pair are identical to one another.

The differential 6 further comprises:
- a first body SH1 traversed by the input shafts 8, 10;
- a first sun gear S1 and a second sun gear S2 connected in rotation, respectively, to the input shafts 8, 10, and meshing with a first planet gear P1 and a second planet gear P2;
- a first shaft PS1 that supports in a rotatable way the planet gears P1, P2 (mounted idle thereon);
- a first planet carrier PC1 within which the shaft PS1 and the gears P1, P2, S1, S2 are located; and
- a first crown wheel C1 with conical toothing fixed to the planet carrier PC1.

All the gears P1, P2, S1, S2 have, in this embodiment, conical toothing. It is possible of course to envisage use, in other embodiments, of differentials with cylindrical gears.

The shaft PS1 can be equivalently replaced by two separate shafts, one for each planet gear P1, P2.

The crown wheel C1 has conical toothing and meshes with a first gear W1 with conical toothing, which is set inside the body SH1 and is connected in rotation to the output shaft 12 that traverses the body SH1 itself.

Figure 3:
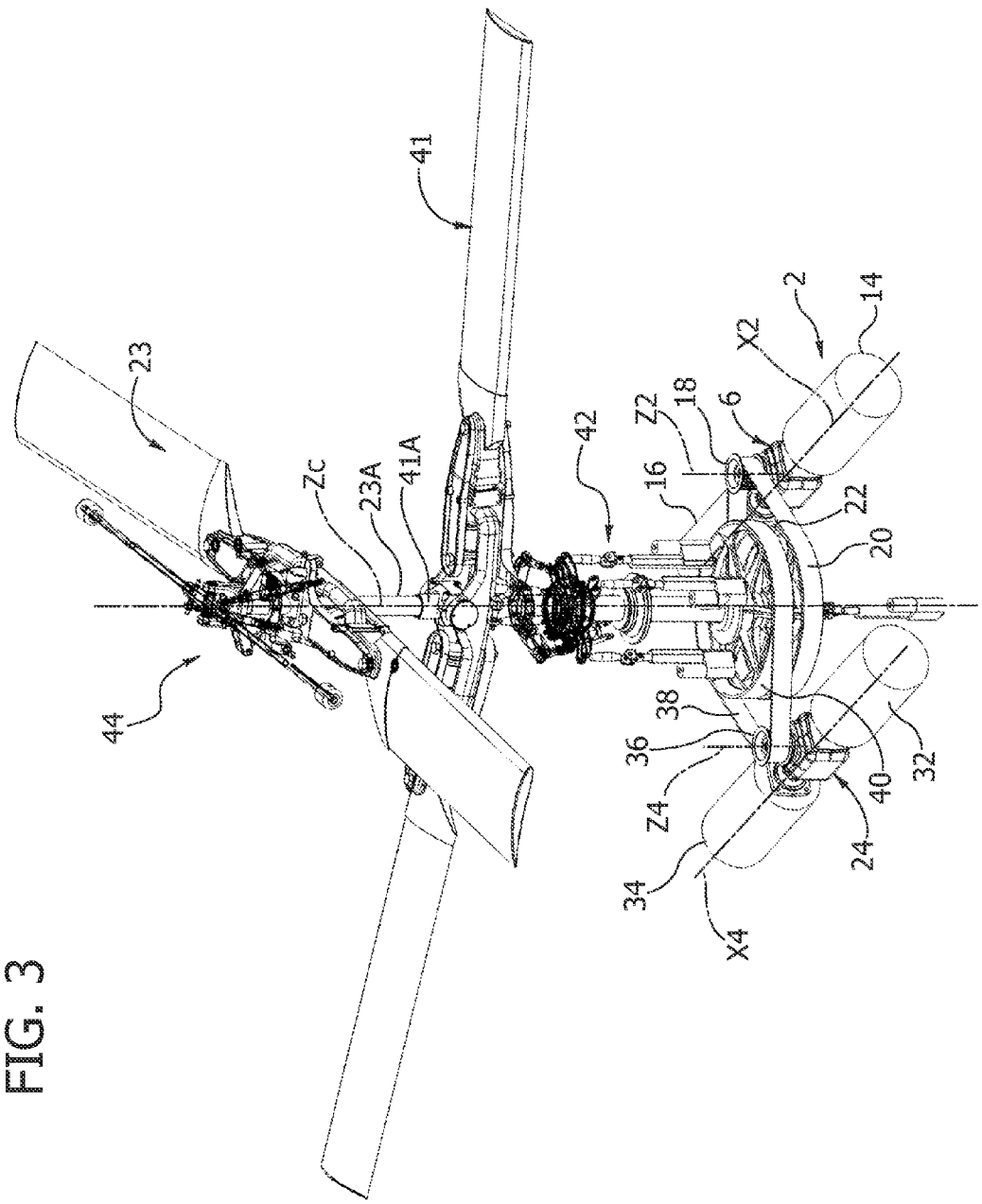
FIG. 3 is a perspective view of a rotor assembly of a rotary-wing aircraft that uses the propulsion and motion-transmission assembly of FIG. 1.

Connected in rotation to the output shaft 12 is a first drive pulley 18, which can rotate about the axis Z2, and is in turn connected in rotation, by means of a first transmission belt 20, to a first driven pulley 22, which can rotate about an axis $Z_c$ parallel to the axis Z2. With reference to FIGS. 2, 3, the driven pulley 22 is arranged for connection in rotation to a first rotor 23 of a rotary-wing aircraft by means of a first transmission shaft 23A sharing the axis $Z_c$.

The driven pulley 22 preferably has a diameter considerably larger than that of the drive pulley 18. It will be appreciated, on the other hand, that the pulleys 18, 22 and the belt 20 provide a mechanical transmission that can be replaced by any equivalent one, for example a gear transmission or a chain transmission.

The second motor-reducer assembly 4 is completely identical to the motor-reducer assembly 2 and comprises a second differential 24 of a mechanical type and preferably open, identical to the differential 6 and including a third input shaft 26 and a fourth input shaft 28 coaxial with one another and to a third axis of rotation X4 (about which they can turn), preferably parallel to the axis of rotation X2, and a second output shaft 30, which can turn about and has its axis coinciding with a fourth axis of rotation Z4 orthogonal to the axis X4 and parallel to the axis Z2. With reference once again to FIG. 2, in a way similar to the differential 6, the differential 24 comprises:
- a second body SH2 traversed by the input shafts 26, 28;
- a third sun gear S3 and a fourth sun gear S4, which are connected in rotation, respectively, to the input shafts 26, 28, and mesh with a third planet gear P3 and a fourth planet gear P4;
- a second shaft PS2, which supports in a rotatable way the planet gears P3, P4 (mounted idle thereon);
- a second planet carrier PC2, within which the shaft PS2 and the gears P3, P4, S3, S4 are located; and
- a second crown wheel C2 with conical toothing fixed to the planet carrier PC2.

The crown wheel C2 meshes with a gear W2, which also has conical toothing, is set inside the body SH2, and is connected in rotation to the output shaft 30 that traverses the body SH2 itself.

Connected to the input shafts 26, 28 are, respectively, a third electric motor 32 and a fourth electric motor 34 that are identical to one another and to the motors 14, 16. The electric motors 32, 34 are coaxial with one another and to the axis X4.

Connected in rotation to the output shaft 30 is a second drive pulley 36, which can turn about the axis Z4 and is connected in rotation, by means of a second belt 38, to a second driven pulley 40, which in this embodiment is identical and set coaxial to the driven pulley 22. The second driven pulley 40 is arranged for connection in rotation to a second rotor 41 of the rotary-wing aircraft by means of a second transmission shaft 41A, which is hollow and set inside which is the first transmission shaft 23A.

The first rotor 23 is operatively connected to a device for variation of the cyclic pitch, designated as a whole by 42, which is to be considered of a conventional type and consequently does not call for a detailed description herein. The second rotor 41 is operatively connected to a stabilizer bar 44, which is also of a conventional type and the structure of which is known to the person skilled in the branch.

The complex of motor-reducer assemblies 2, 4 coupled to the respective rotors 23, 41 thus defines a rotor assembly of a rotary-wing aircraft (FIG. 3).

Operation of each motor-reducer assembly 2, 4, and of the assembly 1 is described in what follows.

Considering the motor-reducer assembly 2 (operation of the motor-reducer assembly 4 is altogether identical and the ensuing description also applies to the corresponding components of the motor-reducer assembly 4), each of the motors 14, 16 transfers mechanical power to the differential 6 by means of the input shafts 8, 10. From these, the mechanical power is transferred to the sun gears S1, S2, then to the planet gears P1, P2 and to the planet carrier PC1, from which it is transferred to the output shaft 12 and to the pulley 18 by means of the crown wheel C1 and the gear W1.

From the latter, by means of the belt 20, a motion of rotation is transmitted to the driven pulley 22 and from this to the rotor 23. The rotor 23 is thus driven in rotation by the two electric motors 14, 16 in conditions of normal operation.

The motor-reducer assembly 2 is intrinsically redundant, since in the event of a failure of one of the motors 14, 16 the transmission of power to the pulley 22 is in any case possible. In fact, assuming that the motor 14 is in conditions of breakdown and the transmission of power to the differential 6 and to the rotor 23 ceases on account of a failure, the motor 16 can continue to deliver power via the input shaft 10 connected thereto, and moreover, thanks to the differential 6, does not have to drive the motor 14 that has failed.

In fact, the sun gear S1 connected to the motor 14 remains stationary, whilst the planet gears P1, P2 are drawn in rotation about their own axis and also about the axis of rotation of the sun gear S1 (which coincides with the axis X2) by the motor 16 via the sun gear S2, keeping anyway the planet carrier PC1, the output shaft 12, and the rotor 23 in rotation.

It should be noted that, in order to obtain what is described above, the differential 6 must be of an open type, since a self-locking differential, albeit with a minimal locking ratio, would force the motor still functioning to drive the motor that has failed.

Of course, this applies in an identical way in the event of a failure of the motor 16, as likewise applies to the motor-reducer assembly 4, given that the motor-reducer assemblies 2, 4 are structurally and functionally identical.

Furthermore, the size of each electric motor 14, and 32, 34 is chosen in a such a way that it functions at 50% of its own maximum power when the corresponding motor-reducer assembly 2, 4 is not in failure conditions. In the event of a failure, for example, of the electric motor 14 and/or of the electric motor 32, it is sufficient to bring the electric motor 16 and/or, respectively, 34 that are/is still functioning to the maximum of the power that can be delivered thereby in order to render the impact of the breakdown on operation of the assembly 1 substantially zero.

Basically, each electric motor of each motor-reducer assembly 2, 4 is chosen in such a way that it develops a maximum power substantially equal to twice the power required for driving in rotation a load connected to the corresponding motor-reducer assembly, in particular the first and second rotors 23, 41.

By means of the motor-reducer assemblies 2, 4 the rotors 23, 41 are driven in rotation in directions opposite to one another, the purpose of this being, evidently, to annul the torque of reaction on the frame of the rotary-wing aircraft on which the assembly 1 is installed.

By exploiting the characteristics described above of redundancy and of behaviour during a failure of the motor-reducer assemblies 2, 4, it is evident that the aircraft on which the assembly 1 is installed is capable of flying in total safety even in the event of breakdown failure of an electric motor for each motor-reducer assembly 2, 4. Hence, the aircraft can fly in conditions of safety with a maximum of two failed electric motors, provided that they belong to different motor-reducer assemblies. In other words, the assembly 1 can function even with just the contribution of two electric motors of the four installed, provided that the two failed motors (or, equivalently, the two functioning electric motors) are not connected to the same differential and hence to the same rotor.

Furthermore, unlike normal propulsion and motion-transmission assemblies in which actuation is provided by means of a reciprocating thermal engine or by means of a gas turbine, where the variation of the r.p.m. is a problematic operation not devoid of risks, in this case it is possible to vary the r.p.m. of each rotor 23, 41 in a completely independent way and simply acting on the supply voltage of the electric motors 14, 16 and 32, 34.

Said possibility of variation of the r.p.m. enables forgoing the adoption of a mechanical command for variation of the collective pitch of the rotors 23, 41, since the effect of the variation of the collective pitch is obtained simply by varying the r.p.m. of each rotor.

Furthermore, the feasibility allowed by the voltage regulation of the electric motors 14, 16 and 32, 34 enables reduction of the velocity of rotation of the rotors 23, 41 during flight, which in turn enables increase in the speed of translation of the aircraft.

In fact, the velocity of the fluid with respect to the blades of each rotor basically depends upon the peripheral velocity of the points of the blades themselves, to which the driving velocity due to the motion of advance of the aircraft in the air is to be added. As described previously, when the absolute velocity of the blade with respect to the fluid in which it is immersed reaches critical conditions, i.e., conditions corresponding to those of sonic flow, there is a sudden loss of lift with onset of transonic flutter, which is a condition that is very dangerous for the stability and for safety of the flight of the aircraft. By reducing, instead, the velocity of rotation of the rotors 23, 41 the component of peripheral velocity of the blades is reduced, hence departing from the regime of sonic flow described previously.

The use of the assembly 1 for actuation of the rotors 23, 41 moreover presents a further advantage from the standpoint of controllability of the aircraft and of stability of the parameters of flight. In particular, unlike systems supplied by fuel (for example, the reciprocating thermal engines and the gas turbines referred to above), the assembly 1 is supplied by means of a set of batteries, which evidently do not vary their own weight during service. There is hence the advantage of having available a system with a substantially constant weight, which enables flying with the same parameters during the entire transfer.

The use of mechanical differentials for the transmission of motion from the motors 14, 16 and 32, 34 to the rotors, respectively, 23 and 41 moreover enables decoupling of the harmonic motions proper to the blades of the rotors with respect to the motion of the electric motors, since the possible oscillations transmitted along the transmission shafts 23A, 41A are substantially "filtered" by the differentials 6, 24 by means of slight rotations of the planet gears P1, P2 and P3, P4 with respect to the corresponding sun gears S1, S2 and S3, S4 connected to the electric motors 14, 16 and 32, 34.

The assembly 1 according to the invention is extremely compact, given the same performance, as compared to similar systems based upon thermal engines with mechanical or hydrostatic transmission. As compared to the latter, in which usually the pressures of the working fluid are of the order of hundreds of bar, the assembly 1 is intrinsically safer in so far as there is not the risk of rupture of one or more of the pipes within which highly pressurized fluid flows.

The assembly 1 can moreover be applied indifferently to a plurality of aircraft, where said term is meant to indicate any vehicle designed for movement in the air, including vehicles designed prevalently for road use on which a flight module is installed. In the latter application, in which the spaces available for installation of a propulsion and motion-transmission assembly are considerably less than those normally available on a vehicle devised for just movement in the air, the considerable compactness of the assembly 1 contributes to an easier installation.

It will moreover be appreciated that, whereas in the embodiment illustrated the propulsion and motion-transmission assembly 1 is arranged for actuation of coaxial and distinct rotors, each of the motor-reducer assemblies 2, 4 of the assembly 1 can be arranged for driving in rotation one and the same (and only one) rotor, for example in a rotary-wing aircraft with a single main rotor and tail rotor or can also be arranged for installation on a twin-noncoaxial-rotor aircraft.

It will moreover be appreciated that each motor-reducer assembly 2, 4 can be used also individually as independent device in vehicles with a single main rotor, since it is intrinsically redundant, as described previously.

It should be noted, in fact, that there is no form of co-operation between the motor-reducer assemblies 2, 4, which substantially does not limit the application to a propulsion and motion-transmission assembly that envisages their combination.

Of course, without prejudice to the principle of the invention, the details of construction and the embodiments may vary widely with respect to what has been described and illustrated herein purely by way of non-limiting example, as defined by the annexed claims.

The invention claimed is:

1. A propulsion and motion-transmission assembly for a rotary-wing aircraft, comprising:
   a first motor-reducer assembly; and
   a second motor-reducer assembly,
   wherein said first and second motor-reducer assemblies are arranged for driving in rotation at least one rotor of a rotary-wing aircraft;
   wherein each of said first and second motor-reducer assemblies comprises:
   a mechanical differential including a first input shaft, a second input shaft, and an output shaft; and
   a first electric motor and a second electric motor connected, respectively, to said first and second input shafts,
   the output shaft of each motor-reducer assembly being arranged for connection in rotation to said at least one rotor of said rotary-wing aircraft; and
   wherein the mechanical differential of each of said first and second motor-reducer assemblies comprises:
   a first sun gear connected to said first input shaft and a second sun gear connected to said second input shaft;
   a first planet gear and a second planet gear, which mesh with said first and second sun gears and are supported in a rotatable way in a planet carrier; and
   a crown wheel fixed to said planet carrier and meshing with a gear wheel connected in rotation to said output shaft.

2. The assembly according to claim 1, wherein the mechanical differential of each of said first and second motor-reducer assemblies is a differential of an open type.

3. The assembly according to claim 1, wherein the first and second input shafts of each mechanical differential are coaxial to one another and to a first axis of rotation about which they can rotate and in that the output shaft of each mechanical differential is coaxial to a second axis of rotation, about which said output shaft is able to rotate and which is orthogonal with respect to said first axis of rotation.

4. The assembly according to claim 1, wherein said crown wheel and said gear wheel have conical toothing.

5. The assembly according to claim 3, wherein the first and second electric motors of each motor-reducer assembly are coaxial to one another and to said first axis of rotation.

6. The assembly according to claim 1, wherein connected in rotation to the output shaft of each mechanical differential is a drive pulley, said drive pulley being in turn connected in rotation, by means of a transmission belt, to a driven pulley arranged for connection in rotation to a rotor of a rotary-wing aircraft.

7. The assembly according to claim 1, wherein said first motor-reducer assembly is arranged for the actuation of a first rotor of a rotary-wing aircraft and in that said second motor-reducer assembly is arranged for the actuation of a second rotor of said rotary-wing aircraft.

8. The assembly according to claim 1, wherein each electric motor of each of said first and second motor-reducer assemblies has a maximum power equal to twice the power required for driving in rotation a load, in particular a rotor of a rotary-wing aircraft, connected to the corresponding motor-reducer assembly.

9. A rotary-wing aircraft comprising a propulsion and motion-transmission assembly, the assembly comprising:
   a first motor-reducer assembly; and
   a second motor-reducer assembly,
   wherein said first and second motor-reducer assemblies are arranged for driving in rotation at least one rotor of a rotary-wing aircraft;
   wherein each of said first and second motor-reducer assemblies comprises:
   a mechanical differential including a first input shaft, a second input shaft, and an output shaft; and
   a first electric motor and a second electric motor connected, respectively, to said first and second input shafts,
   the output shaft of each motor-reducer assembly being arranged for connection in rotation to a rotor of a rotary-wing aircraft; and
   wherein the mechanical differential of each of said first and second motor-reducer assemblies comprises:
   a first sun gear connected to said first input shaft and a second sun gear connected to said second input shaft;
   a first planet gear and a second planet gear, which mesh with said first and second sun gears and are supported in a rotatable way in a planet carrier; and
   a crown wheel fixed to said planet carrier and meshing with a gear wheel connected in rotation to said output shaft.

* * * * *